United States Patent [19]
Nellums

[11] Patent Number: 5,456,344
[45] Date of Patent: Oct. 10, 1995

[54] SELF-ADJUSTING CLUTCH AND INPUT SHAFT BRAKE ACTUATOR

[75] Inventor: Richard A. Nellums, Farmington Hills, Mich.

[73] Assignee: Eaton Corporation, Cleveland, Ohio

[21] Appl. No.: 210,704

[22] Filed: Mar. 18, 1994

[51] Int. Cl.⁶ ................................ F16D 67/04
[52] U.S. Cl. .............. 192/13 R; 192/91 A; 192/111 A; 192/18 A
[58] Field of Search ............ 192/13 R, 18 A, 192/12 C, 91 A, 111 A, 70.25, 85 CA

[56] References Cited

U.S. PATENT DOCUMENTS

| | | | |
|---|---|---|---|
| 3,213,989 | 10/1965 | Harting | 192/18 A X |
| 3,548,989 | 12/1970 | Root | 192/111 A |
| 3,743,070 | 7/1973 | Howard et al. | 192/13 R |
| 3,912,058 | 10/1975 | Parkins | 192/18 A |
| 3,942,617 | 3/1976 | Poon | 192/111 A |
| 4,445,600 | 5/1984 | Schmidt . | |
| 4,712,659 | 12/1987 | Flotow . | |
| 4,848,527 | 7/1989 | Kamio | 192/13 R |
| 5,186,291 | 2/1993 | Hedstrom et al. . | |

*Primary Examiner*—Richard M. Lorence
*Attorney, Agent, or Firm*—Brooks & Kushman

[57] ABSTRACT

A self-adjusting clutch and input shaft brake actuator system is provided for consistent actuation of the input shaft brake after complete disengagement of the master clutch. A dual piston arrangement is fluidly coupled and includes an oil bypass path for adjusting the fluid coupling while the master clutch is engaged. The oil bypass path allows adjustment of the master clutch release tube by changing its position relative to the input shaft brake. This compensates for the wearing of the friction material in the master clutch while maintaining a constant travel for master clutch disengagement and input shaft brake application resulting in consistent application of the input shaft brake upon disengagement of the master clutch.

27 Claims, 4 Drawing Sheets

SELF-ADJUSTING CLUTCH AND INPUT SHAFT BRAKE ACTUATOR

TECHNICAL FIELD

The present invention relates to an apparatus and method for automatically adjusting the actuation of a friction clutch and input shaft brake.

BACKGROUND ART

A traditional clutch functions as a releasable coupling between an engine and a transmission. Engines and transmissions are utilized in a number of diverse applications, including motor vehicles as well as stationary power plants. A simple friction clutch consists of two discs which are forced together by a spring when the clutch is engaged allowing the clutch to transmit torque from the engine to the transmission. Typically, at least one of the discs is lined with a material having a high coefficient of friction and able to withstand high temperatures without excessive wear. Alternatively, a double-faced friction disc may be interposed between two elements of the driving disc.

To engage the clutch, the driving disc is moved into contact with the driven disc thereby reducing the relative speed difference between the discs until they are coupled through the frictional force. As is well known, this process abrades the friction lining of the clutch thereby reducing its thickness. Therefore, on a subsequent clutch engagement, the driving disc must travel an incrementally greater distance for proper engagement. The clutch actuating mechanism is connected to the driving disc, so it must also change position with wear of the friction lining. Eventually, the driving disc travel will be beyond the limits provided for by the clutch actuating mechanism. The mechanism must then be adjusted to account for this wearing of the friction lining. An adjustment is also required after the friction material is replaced (due to excessive wear) to achieve the proper travel distance.

Thus, for consistent clutch operation, a constant travel distance between the disengaged position and the engaged position of the driving disc should be maintained. This requires adjusting the position of the clutch actuating mechanism as the friction material wears. This adjustment may be accomplished manually at periodic intervals, or automatically as friction material wear occurs. It is desirable to have an automatic adjustment mechanism although it often requires a more complex actuating mechanism or clutch which is also more expensive.

When the transmission is in neutral gear and the clutch is disengaged after being engaged with the engine running, the inertia of the driven members tends to keep them rotating, with only a gradual decrease in speed due to friction. The inertia is proportional to the mass of the rotating members and their equivalent radius of gyration. This inertia is especially significant in heavy-duty powertrain applications, such as those utilized by tractor semi-trailer vehicles, as well as stationary powertrains such as those used in power generation facilities and in oil drilling applications. Such demanding applications require more massive components having a correspondingly larger inertia to accommodate their increased torque requirements.

The residual rotation after the clutch is disengaged creates a delay of several seconds before the driven members slow down to the correct speed to allow engagement of the next transmission gear. Although this time period may seem trivial, it becomes significant in a heavily loaded vehicle ascending an incline where the loss in momentum during the delay may result in a missed shift. It also becomes significant when considering its cumulative effect in that many heavy-duty applications require the operator to shift fifteen times or more before reaching highway speeds. Therefore, after the clutch is fully disengaged, it is desirable to reduce the time required for the driven members to slow down, in the case of a moving upshift, or to stop rotating completely, in the case of a stationary shift.

The device used to reduce the time required to slow down or stop rotation of the driven members after the clutch is fully disengaged is generically referred to as an input shaft brake. It can also be called an inertia brake, a clutch brake, or an upshift brake. A simple type of brake is normally used under low-torque conditions, such as when the engine is at idle and the vehicle is stopped, to engage the starting gear. An example of this type of brake consists of a single steel plate having a friction material on one or both faces and splined to the input shaft of the transmission. Upon disengagement of the master clutch, further travel of the non-rotating master clutch release bearing or similar actuating device clamps the plate with friction material against the transmission housing thereby decelerating the input shaft.

Traditionally, two arrangements of release bearings have been utilized. In the first arrangement, the release bearing moves rearward to disengage the master clutch while in the second arrangement, the release bearing moves forward to disengage the master clutch. Heavy-duty commercial vehicles, such as tractor semi-trailer trucks, typically utilize the first arrangement which then allows the input shaft brake to be actuated by further travel of the release bearing. The second arrangement may also be utilized with an input shaft brake, however, the actuating mechanisms for the master clutch and the input shaft brake would need to travel in opposite directions.

A higher torque capacity brake may be used to improve the speed of upshifts. Typically, a small, multiple-disc clutch is used to perform this function. This kind of brake may be mounted in-line with the transmission input shaft or may be off-axis. The in-line arrangement may be directly actuated upon disengagement of the master clutch by further travel of the master clutch release bearing. The off-axis arrangement may be actuated by fluid pressure, such as hydraulic or pneumatic pressure, and may be connected to the input shaft through a primary drive gear of the transmission rather than directly.

The vehicle operator indicates the desire to utilize the input shaft brake by depressing the clutch pedal so that it travels beyond a detent position. The detent position corresponds to the point of complete disengagement of the master clutch. The fully depressed clutch pedal actuates a pressure source (as described above) which is used to force the multiple friction plates of the input shaft brake together thereby applying the input shaft brake and slowing or stopping the inertial rotation.

It is important to coordinate the actuation of the input shaft brake with the complete disengagement of the master clutch. If the input shaft brake is applied prior to complete disengagement, the torque being transmitted through the master clutch may cause excessive heating and wear in the input shaft brake resulting in premature failure. A delay in actuation of the input shaft brake after the master clutch is fully disengaged is undesirable since it defeats the purpose of using an input shaft brake in the first place. The vehicle operator will also have trouble controlling application of the input shaft brake if it does not always engage at the same position of the clutch pedal.

As is well known in the art, coordinated control of the master clutch and the input shaft brake can be accomplished by manually coupling the actuators for these mechanisms. However, the change in master clutch travel resulting from friction material wear also changes the relationship between the disengagement of the master clutch and the application of the input shaft brake (input shaft brake wear is normally insignificant). It is desirable to maintain a constant relationship between these two events for consistent application of the input shaft brake which requires adjustment of the input shaft brake actuator, the master clutch actuator, or both.

DISCLOSURE OF THE INVENTION

It is, therefore, an object of the present invention to provide apparatus for coordinating application of an input shaft brake with complete disengagement of a master clutch.

It is an additional object of the present invention to provide apparatus for automatically compensating for wearing of friction material in a master clutch so as to achieve consistent positioning of the actuating mechanism for master clutch engagement and disengagement.

A further object of the present invention is to provide apparatus for automatically compensating for wearing of friction material in a master clutch so as to achieve consistent positions of the actuating mechanism for application of an input shaft brake.

Still another object of the present invention is to provide apparatus for consistent actuation of a master clutch and input shaft brake which can be utilized with standard clutch release hardware.

An additional object of the present invention is to provide compact apparatus for consistent actuation of a master clutch and input shaft brake thereby increasing the available space for master clutch travel allowances.

Yet another object of the present invention is to provide apparatus for consistent hydraulic actuation of a master clutch and input shaft brake which utilizes a traditional hydraulic master cylinder.

Still another object of the present invention is to provide a method for consistent hydraulic actuation of a master clutch and input shaft brake which includes coupling actuation of the two devices while allowing independent, automatic adjustment.

In carrying out the above object and other objects and features of the present invention, a self-adjusting hydraulic clutch and input shaft brake actuator system is provided which utilizes a multiple piston arrangement. The self-adjusting feature includes an oil bypass path which is blocked during movement initiated by the master clutch release levers. The oil bypass path allows adjustment of the master clutch release tube by changing its position relative to the clutch release levers and also relative to the input shaft brake apply piston when the master clutch is engaged. This compensates for the wearing of the friction material in the master clutch while maintaining a constant travel for master clutch disengagement and input shaft brake application.

In one embodiment, master and slave pistons are concentrically arranged thereby reducing axial packaging space to increase available space for travel allowances. This embodiment utilizes a bypass passage separate from a pressurized-fluid delivery passage.

Another embodiment utilizes a traditional hydraulic master cylinder located at the clutch pedal as a power source in a hydraulic clutch actuation system. The master clutch release piston includes a small control passage which seals when pressure is applied, but allows flow when clutch release pressure returns to a low value because the master clutch is engaged. This allows repositioning of the master clutch release piston as the friction material of the master clutch wears, while also adjusting the position of the input shaft brake piston relative to the master clutch release piston. This provides clearance in the input shaft brake piston which is equal to normal clutch release travel so as to allow consistent actuation of the input shaft brake only after the master clutch is fully disengaged.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 1 is a cross-sectional view of a self-adjusting clutch and input shaft brake actuator utilizing an axial piston arrangement for use with a hydraulically actuated clutch according to the present invention;

BEST MODE(S) FOR CARRYING OUT THE INVENTION

Figure 1:
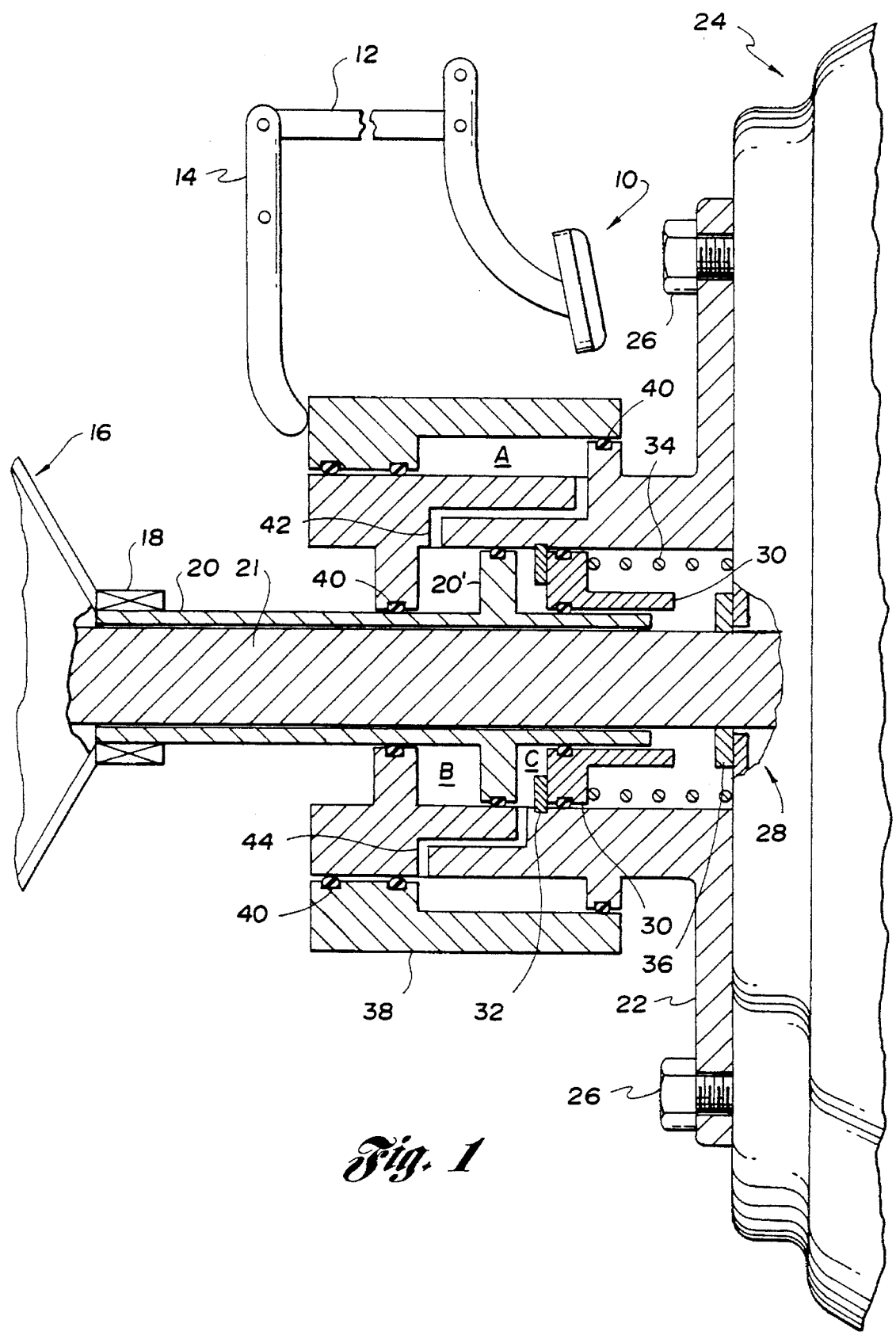
FIG. 1 is a cross-sectional view of a self-adjusting clutch and input shaft brake actuator utilizing a concentric piston arrangement for use with a mechanically actuated clutch according to the present invention.

Referring now to FIG. 1, a cross-sectional view of a self-adjusting clutch and input shaft brake actuator utilizing a concentric piston arrangement according to the present invention is shown. A standard clutch pedal 10 is connected via mechanical linkage 12 to standard clutch release levers 14, as is well known in the art. Usually, at least two release levers 14 (only one of which is shown for the sake of clarity) are utilized to release a master clutch, indicated generally by reference numeral 16.

Still referring to FIG. 1, master clutch 16 is coupled via release bearing 18 to clutch release tube 20 which has a flange 20' disposed within housing 22. Housing 22 is mounted to a transmission, indicated generally by reference numeral 24, via fasteners 26, the transmission having a standard input shaft brake indicated generally by reference numeral 28. Transmission 24 also includes an input shaft 21, shown for reference purposes only, disposed within clutch release tube 20. Input shaft brake apply piston 30 is disposed within housing 22 and held in its release position against retaining ring 32 by spring 34. Preferably, input shaft brake plate 36 is disposed within housing 22 but it may also be an integral component of input shaft brake 28. Master piston 38 is disposed about housing 22. A retaining ring and spring arrangement could also be used to bias master piston 38 away from transmission 24 when there is no load being applied by clutch release levers 14.

Appropriate seals 40, such as lip seals, are used at various locations to create annular regions A, B, and C. Preferably, the annular regions are filled with an incompressible (constant density) fluid, such as hydraulic fluid. However, acceptable operation may also be accomplished utilizing a compressible fluid, such as air, although different seals 40 may be required. Housing 22 contains a pressurizing channel 42 which connects annular regions A and B, and a bypass channel 44 which connects annular regions A and C while master piston 38 is in the position shown, corresponding to master clutch 16 being engaged.

In operation, clutch pedal 10 is depressed which displaces mechanical linkage 12 thereby exerting an axial force on master piston 38 via clutch release levers 14. The axial force causes master piston 38 to be displaced toward transmission 24 thereby sealing bypass channel 44 and pressurizing annular region A. Annular region B is fluidly coupled to annular region A via pressurizing channel 42 and is therefore similarly pressurized. The fluid pressure exerts an axial force on flange 20' which is proportional to the flange surface area. This force causes clutch release tube 20 to travel toward transmission 24 thereby disengaging master clutch 16.

The sealing of bypass channel 44 decouples annular region C from annular region A such that the movement of clutch release tube 20 toward transmission 24 pressurizes annular region C. The pressure of the fluid in annular region C exerts a force on input shaft brake apply piston 30 which is proportional to the flange surface area of piston 30. This causes piston 30 to travel toward transmission 24 thereby compressing spring 34. When piston 30 contacts input shaft brake plate 36 input shaft brake 28 is applied exerting a frictional force which opposes rotation of input shaft 21.

Of course, several features and functions of the present invention illustrated in FIG. 1 could be rearranged to accommodate the type of master clutches and release levers that disengage by moving the release bearing away from the transmission while also operating an input shaft brake which is located either off-axis or in-line. For example, master piston 38 could be reversed to seal bypass channel 44 and pressurize annular region A when it moves away from, instead of toward, transmission 24. This arrangement would operate in a manner analagous to that of the operation described above (with clutch release levers 14 which were arranged to disengage master clutch 16 by moving the release bearing away from, instead of toward, transmission 24).

If input shaft brake apply piston 30 were fixed to housing 22, then the pressurized fluid in annular region C could be directed through a new passage to operate an off-axis input shaft brake. Fixing input shaft brake apply piston 30 to housing 22 would also make it possible to direct pressurizing channel 42 to annular region C instead of annular region B, thereby allowing operation of the arrangement which moves clutch release bearing 18 away from transmission 24 to disengage master clutch 16. In this case, bypass channel 44 would be connected to annular region B, and a new passage would be used to operate either an in-line or an off-axis input shaft brake.

With continuing reference to FIG. 1, when clutch pedal 10 is released, spring 34 exerts a return force on input shaft brake apply piston 30 to release the input shaft brake. An apply spring (not specifically illustrated) in master clutch 16 exerts a restoring force which acts on clutch release tube 20 causing it to travel away from transmission 24 and engage master clutch 16. This maintains the pressurized state of annular regions A and B thereby exerting a restoring force on master piston 38 which returns to its engaged position since there is no opposing force exerted by clutch release levers 14.

Due to wearing of friction material in master clutch 16, clutch release tube 20 may return to a different position on subsequent clutch engagements thereby resulting in a reduction in the volume of annular region B. As illustrated in FIG. 1, a decrease in the volume of annular region B necessarily results in a corresponding increase in the volume of annular region C. This creates a differential fluid pressure across flange 20' which causes fluid to flow from annular region B, through pressurizing channel 42, to annular region A, through (now open) bypass passage 44, into annular region C. This process effectively adjusts the fluid coupling (annular region C) between the clutch release tube 20 and input shaft brake apply piston 30. Therefore, each time clutch pedal 10 is depressed, clutch release tube 20 and input shaft brake apply piston 30 travel the same distance toward transmission 24 resulting in consistent disengagement of master clutch 16 and application of input shaft brake 28. Of course if the arrangement of Region A is not sufficient to accommodate fluid leakage in fully restoring the component movements, a fluid reservoir could be connected through a new channel (not shown) which is isolated by the first movement of master piston 38 in the same manner as channel 44 is isolated.

Figure 2:
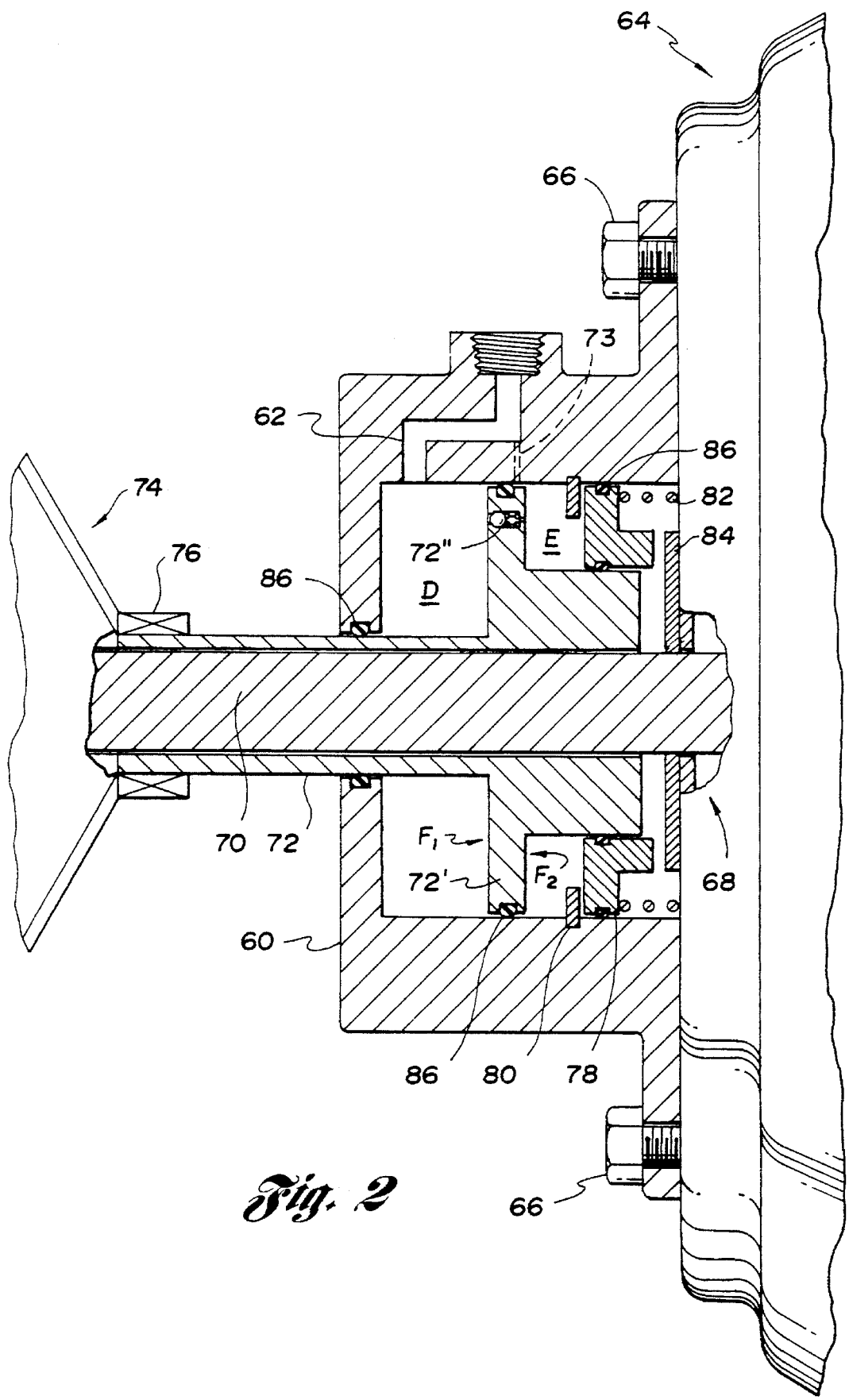

Referring now to FIG. 2, a cross-sectional view of a self-adjusting clutch and input shaft brake actuator utilizing an axial piston arrangement and hydraulic actuation according to another embodiment of the present invention is shown. A standard hydraulic clutch pedal and master cylinder (not specifically illustrated) are fluidly coupled to housing 60 via pressurizing channel 62. Housing 60 is mounted to a transmission, indicated generally by reference numeral 64, via fasteners 66. Transmission 64 includes a standard input shaft brake, indicated generally by reference numeral 68, and an input shaft 70, shown for reference purposes only, disposed within clutch release tube 72.

Still referring to FIG. 2, a standard master clutch 74 is coupled via release bearing 76 to clutch release tube 72 which includes a flange 72' disposed within housing 60. Flange 72' has a differential surface area on its opposing faces $F_1$ and $F_2$ with the larger surface area of face $F_1$ being positioned away from transmission 64. Flange 72' includes a unidirectional flow control device 72", such as a standard check valve, which restricts fluid flow from region D to region E upon pressurization of region D, but which allows flow between region D and region E at low differential pressures. Alternatively, a small orifice could be used to accomplish the same function. Such an orifice would resist rapid flow from region D to region E while clutch release tube 72 is moving to disengage master clutch 74, while allowing some flow for pressure equalization between regions D and E when master clutch 74 is engaged and clutch release tube 72 is stationary. The larger area of face $F_1$ on flange 72' ensures a net force on clutch release tube 72 toward transmission 64, even if pressure from region D creates a pressure in region E, because face $F_2$ on flange 72' has a smaller area. As is known, flow control devices such as check valves are less sensitive to fluctuations in flow produced by changing fluid viscosities related to temperature variations than are small orifices. A pressure equalization channel 73, shown in phantom, may be used to locate flow control device 72" instead of locating flow control device 72" in flange 72'.

Input shaft brake apply piston 78 is also disposed within housing 60 and held in its release position against retaining ring 80 by spring 82. Preferably, input shaft brake plate 84 is disposed within housing 60, but it may also be an integral component of input shaft brake 68. Appropriate seals 86, such as lip seals, are used at various locations to seal fluid within annular regions D and E. Preferably, the annular regions are filled with an incompressible (constant density) fluid, such as hydraulic fluid. However, acceptable operation may also be accomplished utilizing a compressible fluid, such as air, although different seals 86 may be required as well as appropriate actuation apparatus.

With continuing reference to FIG. 2, in operation, a hydraulic master cylinder supplies pressurized hydraulic fluid to pressurizing channel 62 when the hydraulic clutch pedal is depressed. Annular region D becomes pressurized thereby exerting an axial force on flange 72' proportional to the surface area of face $F_1$. The axial force causes clutch release tube 72 to travel toward transmission 64 thereby pressurizing annular region E.

This pressurization results in the movement of piston 78 toward input shaft brake plate 84 thereby compressing spring 82. Thus, clutch release tube 72 and input shaft brake apply piston 78 virtually move in unison coupled by the fluid trapped in annular region E. The length of input shaft brake apply piston 78 is designed such that piston 78 contacts input shaft brake plate 84 when clutch release tube 72 has travelled a sufficient distance to fully disengage master clutch 74. Further displacement of the hydraulic clutch pedal then results in application of input shaft brake 68.

Still referring to FIG. 2, when the hydraulic clutch pedal is released, the return force of spring 82 exerts a return force on input shaft brake apply piston 78 to release input shaft brake 68. An apply spring (not specifically illustrated) in master clutch 74 exerts a restoring force which acts on clutch release tube 72 causing it to travel away from transmission 64 and engage master clutch 74. This maintains the pressurized state of annular region D thereby exerting a restoring force on the hydraulic clutch pedal.

Due to wearing of friction material in master clutch 74, clutch release tube 72 may return to a different position on subsequent clutch engagements thereby resulting in a reduction in the volume of annular region D. As illustrated in FIG. 2, a decrease in the volume of annular region D necessarily results in a corresponding increase in the volume of annular region E. This creates a small differential fluid pressure across flange 72' which causes fluid to flow from annular region D, through flow control device 72" (or alternatively through pressure equalization channel 73 if provided), into annular region E. This process effectively adjusts the fluid coupling (annular region E) between clutch release tube 72 and input shaft brake apply piston 78. Therefore, each time the hydraulic clutch pedal is depressed, clutch release tube 72 and input shaft brake apply piston 78 travel the same distance toward transmission 64 resulting in consistent disengagement of master clutch 74 and application of input shaft brake 68.

Figure 3:
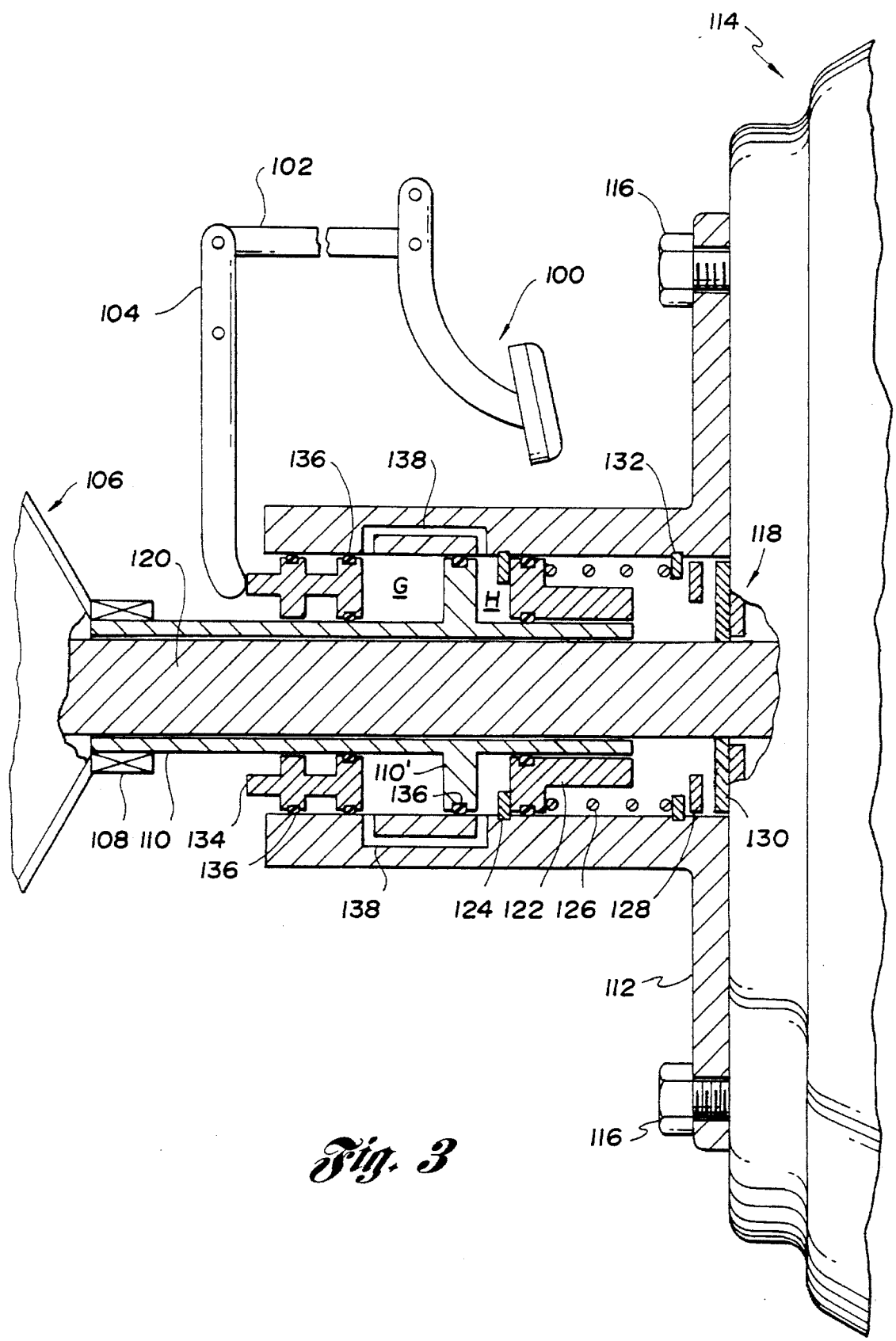
FIG. 3 is a cross-sectional view of a self-adjusting clutch and input shaft brake actuator utilizing an axial piston arrangement for use with a mechanically actuated clutch according to the present invention.

FIG. 3 is a cross-sectional view of another embodiment of a self-adjusting clutch and input shaft brake actuator according to the present invention. This embodiment utilizes an axial piston arrangement for use with a mechanically actuated clutch. A standard clutch pedal 100 is connected via mechanical linkage 102 to standard clutch release levers 104, as is well known in the art. As with the embodiment described in FIG. 1, at least two such release levers are typically utilized, only one of which is shown for the sake of clarity.

Still referring to FIG. 3, a standard master clutch 106 is coupled via release bearing 108 to clutch release tube 110 having flange 110', the tube being disposed within housing 112. Housing 112 is mounted to a transmission, indicated generally by reference numeral 114, via fasteners 116, the transmission having a standard input shaft brake indicated generally by reference numeral 118. Transmission 114 also includes an input shaft 120, shown for reference purposes only, disposed within clutch release tube 110. Input shaft brake apply piston 122 is disposed within housing 112 and held in its release position against piston retaining ring 124 by spring 126. Preferably, a reaction plate 128 and an input shaft brake plate 130 are disposed within housing 112 but either or both may also be integral components of input shaft brake 118. Reaction plate retaining ring 132 provides a positive stop for spring 126. Master piston 134 is disposed about clutch release tube 110 within housing 112.

Appropriate seals 136, such as lip seals, are used at various locations to create annular regions G and H. Preferably, the annular regions are filled with an incompressible (constant density) fluid, such as hydraulic fluid. However, acceptable operation may also be accomplished utilizing a compressible fluid, such as air, although different seals 136 may be required. Housing 112 contains bypass channels 138 which connect annular region G to annular region H while master piston 134 is in the position shown, corresponding to master clutch 106 being engaged.

In operation, clutch pedal 100 is depressed which displaces mechanical linkage 102 thereby exerting an axial force on master piston 134 via clutch release levers 104. The axial force causes master piston 134 to be displaced toward transmission 114 thereby sealing bypass channels 138 and pressurizing annular region G. The fluid pressure exerts an axial force on flange 110' which is proportional to the flange surface area. This force causes clutch release tube 110 to travel toward transmission 114 thereby disengaging master clutch 106. The sealing of bypass channels 138 decouples annular region G from annular region H such that the movement of clutch release tube 110 toward transmission 114 pressurizes annular region H. The pressure of the fluid in annular region H exerts a force on input shaft brake apply piston 122 which is proportional to the piston surface area. Piston 122 travels toward transmission 114 and contacts reaction plate 128, which in turn contacts input shaft brake plate 130, thereby applying input shaft brake 118. When applied, input shaft brake 118 exerts a force which opposes rotation on input shaft 120.

With continuing reference to FIG. 3, when clutch pedal 100 is released, spring 126 exerts a restoring force on input shaft brake apply piston 122 to release the input shaft brake. An apply spring (not specifically illustrated) in master clutch 106 exerts a restoring force which acts on clutch release tube 110 causing it to travel away from transmission 114 and engage master clutch 106. This maintains the pressurized state of annular regions G and H thereby exerting a restoring force on master piston 134 which returns to its engaged position since there is no opposing force exerted by clutch release levers 104.

Due to wearing of friction material in master clutch 106, clutch release tube 110 may return to a different position on subsequent clutch engagements thereby resulting in a reduction in the volume of annular region G. As illustrated in FIG. 3, a decrease in the volume of annular region G necessarily results in a corresponding increase in the volume of annular region H. This creates a differential fluid pressure across flange 110' which causes fluid to flow from annular region G through bypass channels 138 to annular region H. This process effectively adjusts the fluid coupling (annular region H) between the clutch release tube 110 and input shaft brake apply piston 122. Therefore, each time clutch pedal 100 is depressed, clutch release tube 110 and input shaft brake apply piston 122 travel substantially the same distance toward transmission 114 resulting in consistent disengagement of master clutch 106 and application of input shaft brake 118.

Figure 4:
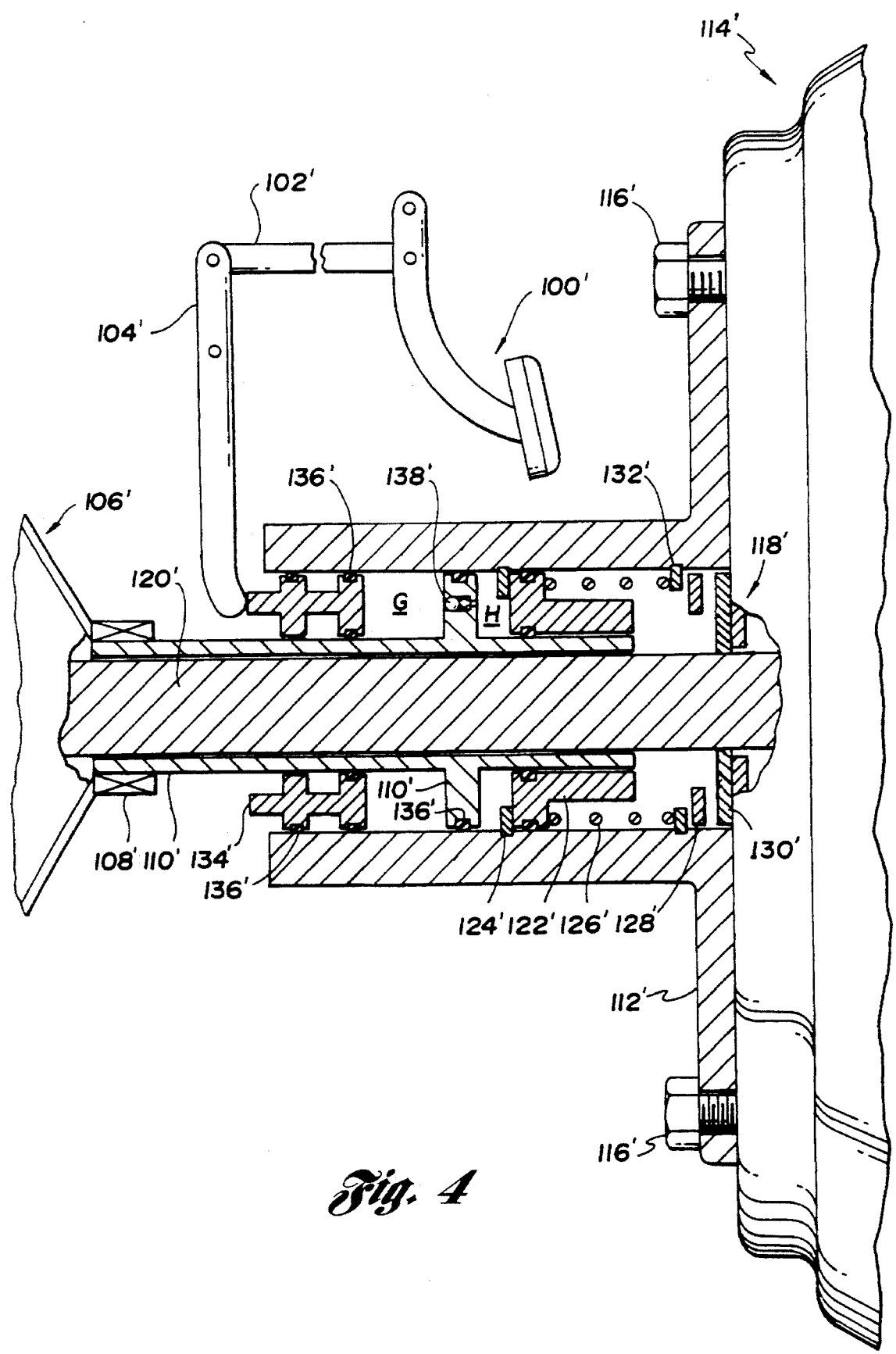
FIG. 4 is an alternative embodiment of a self-adjusting clutch and input shaft brake actuator as illustrated in FIG. 3 incorporating a check ball as illustrated in FIG. 2, according to the present invention.

FIG. 4 illustrates an alternative embodiment of the present invention with primed reference numerals corresponding to components having functions similar to corresponding unprimed reference numerals as illustrated and described with reference to FIG. 3. In this embodiment, bypass channels 138 of FIG. 3 are replaced with a flow control device, such as check ball arrangement 138'.

It is understood, of course, that while the form of the invention herein shown and described includes the best mode for carrying out the invention, it is not intended to illustrate all possible forms thereof. It will also be understood that the words used are descriptive rather than limiting, and that various changes may be made without departing from the spirit and scope of the invention disclosed.

What is claimed is:

1. For use in a powertrain having a master clutch for releasably coupling an engine to an input shaft of a transmission, the transmission including a braking mechanism for decelerating the input shaft upon disengagement of the master clutch, an apparatus for consistently applying the braking mechanism upon disengagement of the master clutch, the apparatus comprising:

a housing;

a first member disposed within the housing and moveable therein so as to define a first region therebetween, the first member being operative to engage and disengage the master clutch and having corresponding engaged and disengaged positions within the housing;

a second member disposed within the housing and moveable therein so as to define a second region interposed between the first and second members, the second member being operative to apply and release the braking mechanism and having corresponding applied and released positions within the housing;

means disposed within the second region for coupling the first and second members so that an axial movement of the first member results in a similar axial movement of the second member; and means for coupling the first and second regions such that the engaged position of the first member is independent of the released position of the second member so as to adjust for master clutch wear during engagement of the master clutch and provide for consistent application of the braking mechanism upon disengagement of the master clutch, wherein axial displacement of the first member effects occlusion of the means for coupling so as to substantially decouple the first and second regions.

2. The apparatus of claim 1 wherein the housing includes a first channel passing between the first region and the housing exterior and a second channel passing between the second region and housing exterior, and wherein the means for coupling the first and second regions comprises a third member moveable and concentrically disposed about the housing so as to define a third region thereabout, the third member having an engaged position corresponding to the engagement of the master clutch and being operative to couple the first and second regions only when in the engaged position.

3. The apparatus of claim 2 wherein the means for coupling the first and second members comprises hydraulic fluid.

4. The apparatus of claim 1 wherein the means for coupling the first and second regions comprises an orifice being of a size to restrict flow of a fluid between the first and second regions while the master clutch is being disengaged.

5. The apparatus of claim 4 wherein the means for coupling the first and second regions extends through the first member.

6. The apparatus of claim 1 wherein the means for coupling the first and second regions comprises a flow control device for permitting flow between the first region and the second region when the master clutch is engaged and resisting flow between the first and second regions when the master clutch is not engaged.

7. The apparatus of claim 6 wherein the means for coupling the first and second regions comprises a check valve disposed within the first member.

8. The apparatus of claim 1 further comprising means for biasing the second member toward the released position.

9. The apparatus of claim 8 wherein the means for biasing comprises a spring interposed between the second member and the housing.

10. The apparatus of claim 1 wherein the first member includes a larger surface area exposed to the first region and a smaller surface area exposed to the second region so as to bias the first member toward the disengaged position when a substantially equal fluid pressure exists in the first and second regions.

11. For use in a powertrain having a master clutch for releasably coupling an engine to an input shaft of a transmission, the transmission including a braking mechanism for decelerating the input shaft upon disengagement of the master clutch, an apparatus for consistently applying the braking mechanism upon disengagement of the master clutch, the apparatus comprising:

a housing;

a first member disposed within the housing and moveable therein;

a second member disposed within the housing and moveable therein defining a first region between the first and second members, the second member being operative to engage and disengage the master clutch and having corresponding engaged and disengaged positions within the housing;

a third member disposed within the housing and moveable therein so as to define a second region interposed between the second and third members, the third member being operative to apply and release the braking mechanism and having corresponding applied and released positions within the housing;

means for coupling the first, second, and third members disposed within the first and second regions so that an axial movement of the first member results in a similar axial movement of the second and third members; and means for coupling the first and second regions such that the engaged position of the second member is independent of the released position of the third member so as to adjust for master clutch wear during engagement of the master clutch and provide for consistent application of the braking mechanism upon disengagement of the master clutch.

12. The apparatus of claim 11 wherein the means for coupling the first and second regions comprises a channel passing between the first and second regions and wherein movement of the first member occludes the channel.

13. The apparatus of claim 11 wherein the means for coupling the first, second, and third members comprises hydraulic fluid.

14. The apparatus of claim 11 wherein the means for coupling the first and second regions comprises means for restricting flow of a fluid between the first and second regions during application of the braking mechanism.

15. The apparatus of claim 14 wherein the means for restricting flow extends through the second member.

16. The apparatus of claim 11 wherein the means for coupling the first and second regions comprises a flow control device for permitting flow between the first and second regions when the master clutch is engaged and resisting flow between the first and second regions when the master clutch is not engaged.

17. The apparatus of claim 16 wherein the means for coupling the first and second regions comprises a check valve disposed within the second member.

18. The apparatus of claim 11 further comprising means for biasing the third member toward the released position.

19. The apparatus of claim 18 wherein the means for biasing comprises a spring interposed between the third member and the housing.

20. For use in a powertrain having a master clutch for releasably coupling an engine to an input shaft of a transmission, the transmission including a braking mechanism for decelerating the input shaft upon disengagement of the master clutch, a method for consistently applying the braking mechanism upon disengagement of the master clutch, the method comprising:

providing a first member disposed within a housing and moveable therein so as to define a first region therebetween, the first member being operative to engage and disengage the master clutch;

providing a second member disposed within the housing and moveable therein so as to define a second region interposed between the first and second members, the second member being operative to apply and release the braking mechanism;

supplying a fluid disposed within the first and second regions so that an axial movement of the first member results in a similar axial movement of the second member;

selectively coupling the first and second regions to permit fluid communication therebetween when the master clutch is engaged, a fluid movement therebetween compensating for a change in volume of the second region due to wear in the master clutch; and substantially decoupling the first and second regions via movement of the first member during disengagement of the master clutch, so as to adjust for master clutch wear during master clutch engagement, and provide for consistent application of the braking mechanism upon disengagement of the master clutch.

21. The method of claim 20 wherein supplying a fluid comprises supplying an incompressible fluid.

22. The method of claim 21 wherein supplying an incompressible fluid comprises supplying hydraulic fluid.

23. The method of claim 20 wherein supplying a fluid comprises supplying compressed air.

24. The method of claim 20 further comprising providing a third member disposed about and concentric with the housing and moveable thereabout so as to define a third region therebetween, the third member being operative to apply and release the first member so as to disengage and engage the master clutch, respectively.

25. The method of claim 20 wherein the second member has an applied position and a released position within the housing corresponding to the braking mechanism being applied and released, respectively, the method further comprising biasing the second member toward its released position.

26. The method of claim 25 wherein biasing the second member comprises interposing a spring between the second member and the housing.

27. For use in a powertrain having a master clutch for releasably coupling an engine to an input shaft of a transmission, the powertrain including a braking mechanism for decelerating the input shaft upon disengagement of the master clutch, an apparatus for consistently applying the braking mechanism upon disengagement of the master clutch, the apparatus comprising:

a housing;

a first piston disposed within the housing and moveable therein so as to define a first region therebetween, the first piston being operative to engage and disengage the master clutch and having corresponding engaged and disengaged positions within the housing;

a second piston disposed within the housing and moveable therein so as to define a second region interposed between the first and second pistons, the second piston being operative to apply and release the braking mechanism and having corresponding applied and released positions within the housing; and at least one channel disposed within the housing for selectively coupling the first and second regions, wherein axial displacement of the first piston during disengagement of the master clutch occludes the at least one channel to decouple the first and second regions so as to adjust for master clutch wear during engagement of the master clutch and provide for consistent application of the braking mechanism upon disengagement of the master clutch.

* * * * *